United States Patent [19]
Lorah et al.

[11] Patent Number: 5,212,251
[45] Date of Patent: May 18, 1993

[54] ALKALI-RESISTANT CORE-SHELL POLYMERS

[75] Inventors: Dennis P. Lorah, Lansdale; Mark S. Frazza, Philadelphia, both of Pa.

[73] Assignee: Rohm and Haas Company, Philadelphia, Pa.

[21] Appl. No.: 587,199

[22] Filed: Sep. 24, 1990

[51] Int. Cl.$^5$ ............... C08F 257/02; C08F 263/04; C08F 265/02; C08F 6/14

[52] U.S. Cl. .................... 525/279; 525/281; 525/284; 525/285; 525/293; 525/296; 525/301; 525/302; 525/308; 525/317; 525/330.2; 525/330.3; 525/340; 525/354; 525/355; 525/902; 106/20 R; 106/287.24; 106/287.29

[58] Field of Search ............ 525/279, 281, 284, 285, 525/293, 296, 301, 302, 308, 317, 330.2, 330.3, 340, 354, 355, 902

[56] References Cited

U.S. PATENT DOCUMENTS

| | | |
|---|---|---|
| 3,037,952 | 6/1962 | Jordan . |
| 4,468,498 | 8/1984 | Kowalski et al. ............ 525/901 |
| 4,876,313 | 10/1989 | Lorah . |
| 4,916,171 | 4/1990 | Brown . |
| 4,972,000 | 11/1990 | Kawashima et al. ............ 521/57 |
| 4,990,571 | 2/1991 | Miyazono et al. ............ 525/274 |
| 5,041,464 | 8/1991 | Hoshino et al. ............ 521/57 |

OTHER PUBLICATIONS

"Concise Chemical and Technical Dictionary", H. Bennett (ed), Chemical Pub. Co., New York, 1947, p. 14.

*Primary Examiner*—James J. Seidleck
*Assistant Examiner*—Vasu S. Jagannathan
*Attorney, Agent, or Firm*—Marvin J. Powell

[57] ABSTRACT

Alkali-resistant core-shell polymers having an acid-insoluble core and an acid-soluble shell are prepared by sequential emulsion polymerization of a monomer mixture having acid-ionizable functionality such that the resulting polymer has an acid-insoluble core and an acid-soluble shell. Films from these alkali-resistant, core-shell polymers are resistant to high pH environments where alkali-resistance is required. The alkali-resistant, core-shell polymers are useful in applications such as inks, clear overprint varnishes, coatings, metal adhesion, fiber treatment, paper treatment, cathodic deposition coatings, stain blocking, coagulants and flocculants.

28 Claims, No Drawings 5,212,251

ALKALI-RESISTANT CORE-SHELL POLYMERS

FIELD OF THE INVENTION

This invention relates to a new generation of alkali-resistant core-shell emulsion polymers. This invention further relates to improved core-shell polymers having an acid-insoluble, emulsion polymer core, and an acid-soluble emulsion polymer shell, wherein the core and the shell are substantially physically associated, and/or substantially covalently bonded together.

BACKGROUND OF THE INVENTION

Mixtures and blends of soluble resins with insoluble emulsion polymers are known in the art and are generally used as binders in ink formulations and as overprint coatings to protect printed substrate. The soluble resins were generally prepared by solution polymerization, such as described in U.S. Pat. No. 3,037,952. First generation core-shell resins made significant improvements over mixtures and blends of the prior art, U.S. Pat. No. 4,916,171. By polymerizing one component in the presence of the other to form core-shell compositions, such as described in '171, improvements in production efficiency, in stability, in water resistance, and in rheology were realized. Although the "one-pot" technique of first generation core-shell polymers made significant improvements over the prior art, the instability of first generation core-shell polymers to formulation additives, such as isopropyl alcohol, continued to be a problem for many ink suppliers. The formulation additive problem was overcome by second generation chemically-grafted core-shell polymers.

By using a polyfunctional compound to chemically graft the core to the shell, U.S. Pat. No. 4,876,313, instability of first generation core-shell polymers to formulation additives was resolved. While first and second generation core-shell compositions made significant improvements over prior art mixtures and blends, further improvements in film resistance to alkaline environments were required.

What is required is novel, alkali-resistant, core-shell compositions. These alkali-resistant, core-shell compositions must be resistant to high pH environments such that they could be applied as a clear overprint coating to protect the printed substrate or provide the same protection as an ink vehicle. Neither prior art blends nor first and second generation core-shell compositions are adequately resistant to alkaline environments. Currently, alkali-resistance is required for cereal boxes, detergent boxes, bar-soap wrappers and the like; specifically, and more generally, in applications using conveyor belts or production lines that are lubricated with high pH "line lubricants." For example, alkali-resistance is necessary in order to protect labels on beverage bottles having printed substrates or provide the same protection for the printed label as a clear overprint coating. Therefore, resistance to high pH environments is essential for core-shell polymers to be used in areas where alkaline line lubricants or other alkaline type conditions exist.

DESCRIPTION OF THE PRIOR ART

Presently, in order to achieve alkali-resistance, the majority of alkali-resistant resins are solvent-based, nonionic types such as, for example, vinyl chloride, vinylidene dichloride and nitrocellulose polymers. These nonionic, alkali-resistant resins are generally prepared by solution polymerization such as described in U.S. Pat. No. 3,037,952. However, what is gained in producing an alkali-resistant resin by solution polymerization is obtained at the risk of hazardous and unhealthy working conditions due to the flammable and toxic nature of the solvent. The present invention eliminates environmental concerns of solvent-based polymers, as well as overcomes the problem of resolubilization of earlier generation core-shell polymers in high pH environments. The core composition and the shell composition of the present invention remain substantially physically associated and/or substantially covalently bonded together. Also, the alkali-resistant, core-shell compositions are useful as a clear overprint coating in high pH environments. Further, the core-shell polymers of this invention maintain formulation stability and eliminate the environmental-concerns of solvent-based polymers by using an emulsion polymerization process. Additionally, the core-shell polymers of the present invention offer the advantage of improved rheology and heat resistance. The core-shell polymers of this invention are also useful in other applications requiring alkali-resistance such as, for example, metal adhesion, fiber treatment, paper treatment, cathodic deposition coatings, stain blocking, corrosion resistance and coagulants/flocculants and the like.

SUMMARY OF THE INVENTION

This invention relates to a novel alkali-resistant, core-shell emulsion polymer containing an acid-insoluble, emulsion polymer core, and an acid-soluble, emulsion polymer shell, wherein the core and the shell are substantially physically associated and/or substantially covalently bonded together. In a sequential emulsion polymerization process, the core-shell components are substantially physically associated and/or substantially covalently bonded together by polymerizing a monomer mixture containing at least one monomer having acid-ionizable, or quaternary, or quaternizable functionality, such that the resulting shell is acid-soluble, and in a separate polymerization stage, form an acid-insoluble core.

DETAILED DESCRIPTION OF THE INVENTION

This invention relates to compositions of core-shell polymers that are substantially physically and/or substantially covalently bonded together and their use in various applications where resistance and stability in high pH environments is required.

The core-shell polymers of this invention are such that upon dissolving the shell with an acid or quaternizing compound, the core and a portion of the shell continue to remain substantially physically associated and/or substantially covalently bonded together. It is the cationic nature that provides films from the core-shell polymers of this invention with alkali-resistance in high pH environments.

The shell polymers of this invention are prepared by using monomer mixtures with acid-ionizable, or quaternary, or quaternizable functionality. Suitable monomers having such functionality include those selected from the group consisting of dimethylaminoethyl (meth)acrylate, diethylaminoethyl (meth)acrylate, tert-butylaminoethyl (meth)acrylate, dimethylaminopropyl (meth)acrylamide, oxazolidinylethyl (meth)acrylate, vinylbenzylamines, vinylphenylamines, 2-vinylpyridines or 4-vinylpyridines, p-aminostyrenes, substituted diallylamines, vinylpiperidines, vinylimidizoles, 2-morpholinoethyl (meth)acrylate, acrylamide, methacrylamide, N-substituted (meth)acrylamides, methacrylamidopropyl trimethyl ammonium chloride (MAPTAC), diallyl dimethyl ammonium chloride (DADMAC), 2-trimethyl ammonium ethyl methacrylic chloride (TMAEMC), quaternary amine salts of substituted (meth)acrylic and (meth)acrylamido monomers, and the like.

Other monomers that may be copolymerized with the functional monomers listed above include those selected from the group consisting of methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylonitrile, styrene, substituted styrene, vinyl acetate, vinyl chloride, and other $C_1$ to $C_{12}$ alkyl acrylates and methacrylates, and the like.

Suitable monomers for the preparation of the core polymers of this invention are selected from the group consisting of methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylic acid, methacrylic acid, itaconic acid, maleic acid, fumaric acid, acrylic anhydride, methacrylic anhydride, itaconic anhydride, acrylonitrile, styrene, substituted styrene, vinyl acetate, vinyl chloride, and other $C_1$ to $C_{12}$ alkyl acrylates and methacrylates, and the like.

The core polymers may optionally also contain monomers having acid-ionizable, or quaternary, or quaternizable functionality, selected from the group consisting of dimethylaminoethyl (meth)acrylate, diethylaminoethyl (meth)acrylate, tert-butylaminoethyl (meth)acrylate, dimethylaminopropyl (meth)acrylamide, oxazolidinylethyl (meth)acrylate, vinylbenzylamines, vinylphenylamines, 2-vinylpyridines or 4-vinylpyridines, p-aminostyrenes, substituted diallylamines, vinylpiperidines, vinylimidizoles, 2-morpholinoethyl (meth)acrylate, acrylamide, methacrylamide, N-substituted (meth)acrylamides, methacrylamidopropyl trimethyl ammonium chloride (MAPTAC), diallyl dimethyl ammonium chloride (DADMAC), 2-trimethyl ammonium ethyl methacrylic chloride (TMAEMC), quaternary amine salts of substituted (meth)acrylic and (meth)acrylamido monomers, and the like. However, the core polymer must have less than 10% by weight of monomers having acid-ionizable, or quaternary, or quaternizable functionality, such that the core is insoluble in acid.

Higher levels of monomers having acid-ionizable, or quaternary, or quaternizable functionality are used in the shell polymer than in the core polymer in order to induce acid solubility. Suitable levels of monomers having acid-ionizable, or quaternary, or quaternizable functionality for the shell polymer range from about 10 to about 60% by weight, preferably about 20 to about 50% by weight. The most preferred monomers having acid-ionizable, or quaternary, or quaternizable functionality for use in the shell polymer are dimethylaminoethyl methacrylate, dimethylaminopropyl methacrylamide, diethylaminoethyl methacrylate, and tert-butylaminoethyl methacrylate. The weight ratio of the core polymer to the shell polymer is preferably about 85:15 to about 15:85, more preferably about 70:30 to about 30:70, and most preferably about 60:40 to about 40:60. Preferably, the core polymer has a weight average molecular weight greater than about 8,000 and the shell polymer has a weight average molecular weight of about 5,000 to about 100,000. The shell polymer contains any chain-transfer agent or mixtures thereof, to control molecular weight of the shell. Suitable chain transfer agents include such as, for example, $C_1$ to $C_{12}$ alkyl mercaptans, or alkylmercaptoalkanoates or halogenated hydrocarbons at levels of about 0.1 to about 10% by weight.

Suitable compounds capable of quaternizing amine functional monomers include those selected from the group consisting of alkyl halides, aryl halides, epichlorohydrin and epoxides such as, for example, ethylene oxide, propylene oxide, epoxy derivatives of Bisphenol A, and the like. Quaternizing agents capable of quaternizing quaternizable monomers generally include any alkylating agents that will react preferentially with the amine functionality.

The core-shell polymers of this invention are neutralized by dissolving the acid-soluble shell with acids selected from the group consisting of acetic acid, formic acid, phosphoric acids (for example, meta-, ortho-, tri-, tetra-,alkyl-), hydrochloric acid, sulfuric acid, methanesulfonic acid, and (meth)acrylic acid (i.e., acids with pKa less than that of the amine-functional monomer). Based on equivalents of amine in the shell polymer, preferably about 0.8 to about 1.5 equivalents of acid are added to the polymer compositions to neutralize and substantially dissolve the shell polymer so as to form a blend of neutralized core-shell polymer and an aqueous solution of neutralized shell polymer, wherein the core-shell polymers are substantially physically associated and/or substantially covalently bonded together. There are various methods for preparing the core-shell polymers of the invention.

Method I is by sequentially emulsion polymerizing a monomer mixture containing at least one monomer having acid-ionizable, or quaternary, or quaternizable functionality and, optionally, a polyfunctional compound to form the shell followed by a second emulsion polymerization to form the core polymer in the presence of the previously polymerized shell. Because of the hydrophilic nature of the shell polymer, it migrates to the particle surface to be at the hydrophilic polymer/water interface. The optional polyfunctional compound serves to substantially covalently bind together a portion of the shell with the core. Core-shell polymers prepared by Method I of this invention may be prepared with or without polyfunctional compounds.

Method II for producing the core-shell polymers of the invention is by sequentially emulsion polymerizing a monomer mixture with optionally a monomer having acid-ionizable, or quaternary, or quaternizable functionality and, optionally, a polyfunctional compound to form the core polymer followed by a second emulsion polymerization utilizing a monomer mixture containing at least one monomer having acid-ionizable, or quaternary, or quaternizable functionality to form the shell polymer in the presence of the previously polymerized core. Core-shell polymers prepared by Method II of this invention may be prepared with or without polyfunctional compounds.

Method III for preparing the alkali-resistant core-shell polymers of the present invention includes polymerizing monomers utilizing at least one monomer having acid-ionizable, or quaternary, or quaternizable functionality and, optionally, a polyfunctional compound under emulsion polymerization conditions to form a low molecular weight hydrophilic shell polymer, neutralizing and solubilizing the polymer with an acid or by quaternization, then polymerizing latex monomer under emulsion polymerization conditions to form a hydrophobic core polymer.

Method IV for preparing the core-shell polymers of the present invention involves addition of a polyfunctional compounds(s) to a previously formed core polymer emulsion. After the core polymer emulsion has been prepared, the polyfunctional compound(s) is(are) added, allowed to soak into the core polymer for about 10 to 60 minutes and polymerized using a redox initiator such as t-butyl hydroperoxide/sodium sulfoxylate formaldehyde/ferrous sulfate. Subsequently, the shell polymer is emulsion polymerized in the presence of the core and substantially chemically grafted thereto by the use of the polyfunctional compound.

The polyfunctional compounds are used to substantially covalently bind the shell polymer to the core polymer, which results in enhanced stability towards added cosolvent and other formulation additives. The core and shell components are substantially covalently bonded together by carrying out the emulsion polymerization of either the core or the shell in the presence of at least one polyfunctional compound having (a) two or more sites of unsaturation, (b) reactive chain transfer agents having two or more abstractable atoms, or (c) hybrid polyfunctional compounds having one or more abstractable atoms and one or more sites of unsaturation. The core-shell polymers of this invention result in polymer compositions having improved stability toward additives (i.e. alcohols, solvents, etc.), redispersability, foam control, heat resistance and desirable rheology.

The polyfunctional compounds are selected from the group consisting of allyl-, methallyl-, vinyl-, and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-di-allyl-, methallyl-, crotyl-, and vinylamides of acrylic and methacrylic acids; N-allyl-, methallyl-, and crotyl- maleimide; vinyl esters of 3-butenoic and 4-pentenoic acids; diallyl phthalate; triallyl cyanurate; O-allyl-, methallyl-crotyl-, O-alkyl-, aryl-, P-vinyl-, P-allyl-, P-crotyl-, and P-methallyl-phosphonates; triallyl-, trimethallyl-, and tricrotyl-phosphates; -O-vinyl-, 0,0-diallyl-, dimethallyl-, and dicrotyl-phosphates; cycloalkenyl esters of acrylic, methacrylic, maleic (mono- and di-esters), fumaric (mono- and di-esters), and itaconic (mono- and di-esters) acids; vinyl ethers and vinyl thioethers of cycloalkenols and cycloalkene thiols; vinyl esters of cycloalkene carboxylic acids; 1,3-butadiene, isoprene and other conjugated dienes; para- methylstyrene; chloromethylstyrene; allyl-, methallyl-, vinyl-, and crotyl-mercaptan; cycloalkyenyl-, allyl-, methallyl-, vinyl-, and crotyl- mercaptopropionates; cycloalkyenyl-, allyl-, methallyl-, vinyl-, and crotyl-mercaptoacetates; bromotrichloromethane; bromoform; carbon tetrachloride; and carbon tetrabromide and the like.

When Method IV is utilized, additional polyfunctional compounds that can be utilized are selected from ethyleneglycol dimethacrylate, diethylenglycol dimethacrylate, triethyleneglycol dimethacrylate, polyethyleneglycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetracrylate, dipentaerythritol pentaacrylate, 1,3-butylene glycol dimethacrylate, trimethylolpropane trimethacrylate, trimethylol propane triacrylate, tripropylene glycol diacrylate, and divinyl benzene and the like.

Preferred polyfunctional compounds for use in Method I or Method III are selected from the group consisting of methallyl-, crotyl-, and vinyl- esters of acrylic acid, methacrylic acid, maleic acid (mono- and di-esters), fumaric acid (mono- and di-esters) and itaconic acid (mono- and di-esters); allyl-, methallyl- and crotyl- vinyl ether; N- or N,N di-, methallyl-, crotyl- and vinyl- amides of acrylic acid and methacrylic acid; N- methallyl and crotyl- maleimide; cycloalkenyl esters of acrylic acid, methacrylic acid, maleic acid (mono- and di-esters), fumaric acid (mono- and di-esters), fumaric acid (mono- and di-esters), itaconic acid (mono- and di-esters); 1,3-butadiene; isoprene; paramethylstyrene; chloromethylstyrene; methallyl-, crotyl- and vinyl- mercaptan; cycloalkyenyl-, methallyl-, vinyl-, and crotyl- mercaptopropionates; cycloalkyenyl-, methallyl-, vinyl-, and crotyl- mercaptoacetates; and bromotrichloromethane. The polyunsaturated monomers within this list are commonly described as graft-linking monomers which are characterized as having two or more sites of unsaturation of unequal reactivity.

Following Method I or Method III, the polyfunctional compound(s) is used at a level of about 2 to about 30% by weight of the shell polymer, preferably about 3 to about 10%.

The most preferred polyfunctional compounds for use in Method I or Method III include cycloalkenyl and crotyl esters of acrylic and methacrylic acid, crotyl mercaptan, cycloalkyenyl mercaptopropionates, cycloalkyenyl mercaptoacetates, crotyl mercaptopropionate, crotyl mercaptoacetate, and bromotrichloromethane. Alkenyl mercaptoalkylates like crotyl mercaptopropionate, dicyclopentenyloxyethyl mercaptopropionate, and dicyclopentenyl mercaptopropionate have been found to be useful in the preparation of alkali soluble shell core-shell compositions described in U.S. Pat. No. 4,876,313 as well as in Method I or Method II of the acid soluble shell core-shell compositions disclosed herein.

Preferred polyfunctional compounds for use in Method II are selected from the group consisting of allyl-, methallyl-, vinyl-, and crotyl-esters of acrylic, methacrylic, maleic (mono-and di-esters), fumaric (mono- and di-esters) and itaconic (mono- and di-esters) acids; allyl-, methallyl-, and crotyl-vinyl ether and thioether; N- and N,N-di-allyl, crotyl-, methallyl-, and vinyl-amides of acrylic and methacrylic acid; N-allyl-, methallyl-, and crotyl-maleimide; vinyl esters of 3-butenoic and 4-pentenoic acids; diallyl phthalate; triallyl cyanurate; O-allyl, methallyl-, crotyl-, O-alkyl-, aryl-, P-vinyl-, P-allyl P-crotyl-, and P-methallyl- phosphonates; triallyl-, trimethallyl-, and tricrotyl- phosphates; 0,0-diallyl-, dimethallyl-, and dicrotyl- phosphates; cycloalkenyl esters of acrylic, methacrylic, maleic (mono- and di-esters), fumaric (mono- and di-esters), and itaconic (mono-and di-esters) acids; vinyl ethers and thioethers cycloalkenols and cycloalkene thiols; vinyl esters of cycloalkene carboxylic acids; 1,3-butadiene, isoprene, and other conjugated dienes; para-methylstyrene; chloromethylstyrene; allyl-, methallyl-, vinyl-, and crotyl- mercaptan; cycloalkyenyl-, allyl-, methallyl-, vinyl-, and crotyl- mercaptopropionates; cycloalkyenyl-, allyl-, methallyl-, vinyl-, and crotyl-mercaptoacetates; bromotrichloromethane; bromoform; carbon tetrachloride; and carbon tetrabromide. Preferably, the level of said polyfunctional compound(s) ranges from about 0.1 to about 30% by weight of the core, more preferably about 1.0 to about 10%. Most preferably, the polyfunctional compound is allyl acrylate or allyl methacrylate. The use of 1,3-butadiene constitutes a special case, where levels of up to about 100% by weight of the core are useful for certain embodiments.

Polyfunctional compounds suitable for use following Method IV are selected from the group consisting of allyl-, methallyl-, vinyl-, and crotyl-esters of acrylic, methacrylic, maleic (mono- and di-esters), fumaric (mono- and di-esters), and itaconic (mono- and di-esters) acids; allyl- methallyl-, and crotyl-vinyl ether and thioether; N- and N,N-di-allyl-, crotyl-, methallyl-, and vinyl-amides of acrylic and methacrylic acid; N-allyl-, methallyl-, and crotyl-maleimide; vinyl esters of 3-butenoic and 4-pentenoic acids; diallyl phthalate; triallyl cyanurate; O-allyl, methallyl-, crotyl-, O-allyl, aryl-, P-vinyl, P-allyl, P-crotyl-, and P-methallyl-phosphonates; triallyl-, trimethallyl-, and tricrotyl-phosphates; cycloalkenyl esters of acrylic, methacrylic, maleic (mono- and di-esters), fumaric (mono- and di-esters), and itaconic (mono- and di-esters) acids; vinyl ethers and thioethers of cycloalkenols and cycloalkene thiols; vinyl esters of cycloalkene carboxylic acids; and 1,3-butadiene, isoprene, and other conjugated dienes. In addition, compounds of the type commonly described as crosslinking polyunsaturated monomers having two or more sites of unsaturation of approximately equal reactivity can be used such as, for example, ethyleneglycol dimethacrylate, diethyleneglycol dimethacrylate, triethyleneglycol dimethacrylate, polyethylene glycol dimethacrylate, -polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetracrylate, dipentaerthritol pentaacrylate, 1,3-butylene glycol dimethacrylate, trimethylolpropane trimethacrylate, trimethylol propane triacrylate, tripropyleneglycol diacrylate, and divinyl benzene.

The level of polyfunctional compound(s) useful in Method IV ranges from about 5 to about 30%, expressed as weight percent of the core polymer, preferably about 10 to about 20%. Monofuctional monomers may also be added with the polyfunctional compound up to a level of about 70% by weight of the total monomers and polyfunctional compounds added to the previously formed core emulsion.

The alkali-resistant core-shell polymers of this invention are useful in various applications where exposure to high pH environments is required. They are particularly useful when neutralized and utilized in printing inks or applied over a printed substrate as a clear overprint coating, or a combination thereof. By developing the alkali-resistance in the ink, you eliminate the need to protect the printed substrate with an overprint coating, thus, reducing processing costs. These alkali-resistant compositions are useful under conditions where the printed substrate must be protected from caustic line lubricants. Some other uses include metal adhesion, fiber treatment, paper processing, cathodic deposition coating, stain blocking, corrosion resistance, coagulants and flocculants.

The examples which follow demonstrate that the core-shell polymers of this invention, when compared to prior art blends and early generation core-shell polymers, are alkali-resistant and capable of use in high pH environments.

Alkali-resistance refers to the fact that the printed substrate, protected by core-shell polymers of this invention, was not damaged by alkaline detergents. The examples further demonstrate that the core-shell polymers of this invention are stable in ink formulations. Stability means that the alkaliresistant polymers of this invention were used to prepare ink and did not cause the formation of coagulum or grit, nor was there significant thickening with time. As an overprint coating, the application of the alkali-resistant, core-shell polymers of this invention protected the printed substrate from alkaline agents.

The purpose and intent of the following examples is only to illustrate the invention. It is intended and must be clearly understood that this invention is not, by any means, limited by such examples.

EXAMPLES PREPARED BY METHOD I

EXAMPLE 1

A stirred reactor containing 498 g of deionized (D.I.) water and 5 g of amphoteric surfactant was heated to 60° C. under a nitrogen atmosphere. Then 4.3 g of 1 wt % Versene solution (tetrasodium salt of ethylenediamine tetraacetic acid) and 4.3 g of a 0.15 wt % ferrous sulfate heptahydrate solution was added to the reactor. A charge of 29.8 g of monomer emulsion (M.E.) #1, shown below, was added to the reactor with a 10 g D.I. water rinse, followed by 1.06 g of ammonium persulfate dissolved in 50 g of D.I. water. After 20 minutes, the remainder of M.E. #1 and the cofeed catalyst #1 (shown below) were added to the reactor over an 80 minute period while maintaining the reactor temperature at 60° C. A 20 g D.I. water rinse was used to flush the M.E. feed line to the reactor upon completion of the feed. After holding the batch for 30 minutes at 60° C., a solution of 0.4 g sodium sulfoxylate formaldehyde in 20 g D.I. water was added to the reactor and the temperature increased to 85° C. M.E. #2 (shown below) and cofeed #2 (shown below) were then fed to the reactor over a 60 minute period with the batch temperature maintained at 85° C. Upon completion of the feeds, the M.E. line was rinsed to the reactor with 20 g D.I. water and the batch held at 85° C. for 30 minutes. The reactor was cooled to 55° C., solutions of 5 g 0.15 wt % ferrous sulfate heptahydrate solution, 0.5 g t-butyl hydroperoxide (70%) in 5 g D.I. water, and 0.25 g sodium sulfoxylate formaldehyde in 5 g D.I. water added to the kettle. The batch was further cooled to 45° C. and neutralized with charges of 3 g glacial acetic acid in 15 g water followed by 41.7 g glacial acetic acid.

The final product had a solids content of 42.4% and a Brookfield viscosity of 940 cps at pH 4.8.

| Monomer Emulsion Charges for Example #1 | | |
| --- | --- | --- |
| | Shell M.E. #1 | Core M.E. #2 |
| D.I. water | 140.0 g | 140.0 g |
| Amphoteric (42 wt % in water) Surfacant | 10.1 g | 5.0 g |
| Methyl Methacrylate (MMA) | 255.0 g | 127.5 g |
| Butyl Acrylate (BA) | — | 297.5 g |
| Styrene (STY) | 42.5 g | — |
| Dimethylaminoethyl methacrylate (DMAEMA) | 106.3 g | — |
| dicyclopentenyloxyethyl methacrylate | 21.2 g | — |

| Monomer Emulsion Charges for Example #1 | | |
|---|---|---|
| Octanethiol | 21.3 g Cofeed | — |
| Catalyst #2 | Catalyst #1 | Cofeed |
| Ammonium persulfate | 2.38 g | 0.85 g |
| D.I. water | 100.0 g | 80.0 g |

EXAMPLE 2

Using the above procedure, a similar sample was prepared using 382.5 g of BA and 42.5 g of MMA in the M.E. #2. The final product had a solids of 42.1% and a Brookfield viscosity of 82 cps at pH 4.8.

Additional variations of the above experiment were prepared with the following compositions:

EXAMPLE 3

| | |
|---|---|
| Stage 1 monomer ratio (wt %) | 70 MMA/25 DMAEMA/5 DCPA* |
| Stage 1 chain transfer agent | 8 wt % octanethiol (on monomer) |
| Stage 2 monomer ratio (wt %) | 60 BA/30 MMA/10 Sty |
| Stage 2 chain transfer agent | 1 wt % n-dodecanethiol |
| Final product solids | 37.2% |
| Final product pH | 5.0 |
| Final product Brookfield visc. | 149 cps |

*DCPA is Dicyclopentenylacrylate

EXAMPLE 4

| | |
|---|---|
| Stage 1 monomer ratio (wt %) | 70 MMA/25 DMAEMA/5 DCPA |
| Stage 1 chain transfer agent | 8 wt % octanethiol (on monomer) |
| Stage 2 monomer ratio (wt %) | 65 BA/35 Sty |
| Final product solids | 36.5% |
| Final product pH | 4.9 |
| Final product Brookfield visc. | 143 cps |

APPLICATIONS EXAMPLES USING LATEXES PREPARED BY METHOD I

A clear overprint varnish utilizing latex prepared by Method I was evaluated for alkali-resistance against other Rohm and Haas latexes. The test is designed to evaluate the detergent resistance of ink and clear overprint varnish.

DETERGENT SOLUTION PREPARATION

Heat 100 ml of tap water to 120° F. to 140° F.
Dissolve in the 100 ml one level teaspoon of soap powder.

TEST PREPARATION

1) Cut a 2½ by 2½" square of printed material
2) Cut a 3" by 6" piece of muslin (thin cotton sheet)
3) Cut a piece of blotter paper (approx. 4" by 4") must be larger than the test stack.
4) Obtain a 2½" by 2½" by ⅜" stainless steel metal plate. This plate must have a weight of 12 oz. The weight can be adjusted to give this blocking weight.

TEST

A) Heat soap solution.
B) Place the folded muslin over the blotter paper and pour 10 cc's of the hot soap over the muslin.
C) Place the print face down on the wet muslin.
D) Place the steel plate over the print and allow the stack to sit for 30 minutes.

RATING

1) Remove the plate and inspect the print sample.
2) No color from the ink is to be passed to the muslin.
3) The print is to have no visible damage (blot with a tissue).

CLEAR OVERPRINT VARNISH DETERGENT TEST RESULTS

| | |
|---|---|
| Film from a latex prepared by Method 1 | trace damage only |
| Film from an anionic core shell latex prepared as described in example #6 of U.S. Pat No. 4,876,313 | totally dissolved |
| Film from conventional non core-shell latex | partially dissolved substantial damage |

EXAMPLES PREPARED BY METHOD II

EXAMPLE 5

A stirred reactor containing 440 g of deionized (D.I.) water and 7.1 g of nonionic surfactant (Triton X-405, 70%) was heated to 85° C. under a nitrogen atmosphere. Then a charge of 7.6 g of monomer emulsion (M.E.) #1, shown below, was added to the reactor with a 10 g D.I. water rinse, followed by 0.375 g of ammonium persulfate dissolved in 20 g D.I. water. After 10 minutes, the remainder of M.E. #1 was added to the reactor over a 60 minute period while maintaining the reactor temperature at 85° C. A 10 g D.I. water rinse was used to flush the M.E. feedline to the reactor upon completion of the feed. After holding the batch for 30 minutes at 85° C., a charge of 4 g aqua ammonia (28%) was added to neutralize the first stage emulsion polymer core. M.E. #2 and the stage 2 cofeed catalyst solution (shown below) were then fed to the reactor over a 60 minute period with the batch temperature maintained at 85° C. Upon completion of the feeds, the M.E. line was rinsed to the reactor with 10 g D.I. water, and the batch held at 85° C. for 30 minutes. The reactor was cooled to 65° C., solutions of 3 g 0.15 wt. % ferrous sulfate heptahydrate solution, 0.5 g t-butyl hydroperoxide (70%) in 20 g D.I. water, and 0.25 g sodium sulfoxylate formaldehyde in 20 g D.I. water were added to the kettle. The batch was further cooled to 45° C. and neutralized with a charge of 11.9 g glacial acetic acid. The final product had a solids content of 29.5% and a Brookfield viscosity of 11 cps at pH 5.2.

MONOMER EMULSION AND COFEED CATALYST CHARGES FOR EXAMPLE #5

| | Core M.E. #1 | Shell M.E. #2 |
|---|---|---|
| D.I. water | 24.2 g | 24.2 g |
| Triton X-405 (70 wt %) | 3.6 g | 7.1 g |
| Butyl Acrylate | 85.0 g | — |
| Methyl Methacrylate | 37.5 g | 87.5 g |
| Methacrylic Acid | 2.5 g | — |
| Styrene | — | 6.2 g |
| DMAEMA* | — | 31.2 g |
| n-Dodecylmercaptan | — | 7.5 g |
| Stage 2 Cofeed Catalyst | | |
| Ammonium persulfate | 0.375 g | |

-continued

|  | Core M.E. #1 | Shell M.E. #2 |
|---|---|---|
| D.I. Water |  | 50 g |

*dimethylaminoethylmethacrylate

APPLICATIONS EXAMPLES USING LATEXES PREPARED BY METHOD II

The latex was formulated with predispersed pigment (blue and yellow), drawn down over a clay-coated paper substrate, dried briefly with a heat gun, and tested one hour later. The latex was compared with Joncryl 537 (S. C. Johnson) which is a currently used aqueous ink resin for alkali-resistant applications.

Tests with water, 0.5% ammonium hydroxide, line lubricants and detergent all showed the latex prepared by Method II to have better resistance than the Joncryl 537.

EXAMPLES PREPARED BY METHOD III

EXAMPLE 6

A stirred reactor containing 600 g of deionized (D.I.) water and 7.2 g of amphoteric surfactant (Abex 1404) was heated to 55° C. under a nitrogen atmosphere. Then 6 g of 1 wt % Versene solution and 6 g of a 0.15 wt % ferrous sulfate heptahydrate solution was added to the reactor. A charge of 100 g of monomer emulsion (M.E.) #1, shown below, was added to the reactor followed by 1.5 g of ammonium persulfate dissolved in 30 g of D.I. water. After 5 minutes, the remainder of M.E. #1 was added to the reactor over a one hour period while maintaining the reactor temperature at 55° C. At the same time, cofeed catalyst #1 (shown below) was added to the reactor over a 90 minute period. A 40 g D.I. water rinse was used to flush the M.E. feed line to the reactor upon completion of the feed. Fifteen minutes after completion of the M.E. feed, a solution of 0.6 g sodium sulfoxylate formaldehyde in 10 g D.I. water was added to the reactor. After holding the batch at 55° C. for an additional 15 minutes, 126 g of glacial acetic acid was added to solubilize the stage 1 polymer. The temperature of the batch was then increased to 85° C., and a catalyst charge of 1.5 g ammonium persulfate in 50 g D.I. water added to the reactor. M.E. #2 (below) was then fed to the reactor over one hour (followed by a rinse with 40 g D.I. water), together with cofeed catalyst #2 (below) which was added over 90 minutes with the reactor maintained a 85° C. Upon completion of the cofeed, the batch was cooled to 55° C., solutions of 5 g of 0.15 wt % ferrous sulfate heptahydrate solution, 1.0 g t-butyl hydroperoxide (70%) in 10 g D.I. water, and 0.5 g sodium sulfoxylate formaldehyde in 10 g D.I. water were added to the kettle. The batch was then cooled to ambient temperature and filtered.

The final product had a solids content of 37.9% and a Brookfield viscosity of 920 cps at pH 5.1.

MONOMER EMULSION AND COFEED CATALYST CHARGES FOR EXAMPLE #6

|  | M.E. #1 | M.E. #2 |
|---|---|---|
| D.I. water | 240.0 g | 240.0 g |
| Amphoteric (42 wt % in water) Surfacant | 14.3 g | 7.2 g |
| Methyl Methacrylate | 300.0 g | 210.0 g |
| Butyl Acrylate | — | 390.0 g |
| Dimethylaminoethyl methacrylate | 300.0 g | — |
| n-Dodecylmercaptan (nDDM) | 36.0 g | — |
|  | Cofeed Catalyst #1 | Cofeed Catalyst #2 |
| Ammonium persulfate | 3.0 g | 3.0 g |
| D.I. water | 140.0 g | 140.0 g |

EXAMPLE 7

The process of Example 6 was followed with 300 g of diethylamino-ethyl methacrylate (DEAEMA) used in place of the DMAEMA, and 16.8 g of octylmercaptan used in place of the nDDM. In addition, water was removed to increase the solids. The product had a solids of 44.5% and a Brookfield of 1132 cps at pH 5.2.

EXAMPLE 8

The process of Example 6 was followed, at slightly higher solids, with 300 g of isobutyl methacrylate used in place of the MMA, 16.8 g of octylmercaptan in place of the nDDM, and 600 g styrene as the sole monomer in the M.E. #2. The product had a solids of 40.1% and a Brookfield viscosity of 334 cps at pH 4.9.

EXAMPLE 9

The process of Example 7 was followed, with an M.E. #2 monomer ratio of 50 MMA/50 DMAEMA and an M.E. #2 monomer ratio of 45 BA/55 MMA. The product had a solids of 45.7 and a Brookfield viscosity of 746 cps at pH 5.1.

EXAMPLE 10

The process of Example 9 was followed with an M.E. #2 monomer ratio of 65 BA/32 MMA/3 Allyl methacrylate. The product had a solids of 44.9% and a Brookfield viscosity of 808 cps at pH 5.1.

EXAMPLE 11

The process of Example 7 was followed with an M.E. #1 monomer ratio of 780 MMA/25 DMAEMA/5 DCPA (dicyclopentenyl acrylate) using 4 wt % octylmercaptan (on monomer), and an M.E. #2 monomer ratio of 60 BA/40 MMA using 0.5 wt % nDDM (on monomer). The product had a solids of 42.9% and a Brookfield viscosity of 103 cps at pH 5.0.

EXAMPLE 12

The process of Example 7 was followed with an M.E. #1 monomer ratio of 60 MMA/10 Styrene/25 DMAEMA/5 DCPA using 5 wt % octylmercaptan, and an M.E. #2 monomer ratio of 90 BA/10 MMA using 1.0 wt % nDDM. The product had a solids of 43.1% and a Brookfield viscosity of 45 cps at pH 4.8.

We claim:

1. A composition comprising a core-shell polymer having an acid-insoluble polymer core and an acid-soluble or quaternizable polymer shell, wherein said shell and said core are prepared sequentially by emulsion polymerization, wherein said core having an average molecular weight of greater than about 8,000 and said shell having a weight average molecular weight of about 5,000 to about 100,000, and wherein the ratio of said core to said shell is about 85:15 to about 15:85.

2. The composition of claim 1 wherein said shell is polymerized from monomers selected from the group consisting of dimethylaminoethyl (meth)acrylate, diethylaminoethyl (meth)acrylate, tert-butylaminoethyl (meth)acrylate, dimethyl aminopropyl (meth)acrylamide, oxazolidinylethyl (meth)acrylate, vinylbenzylamines, vinylphenylamines, 2-vinylpyridines, 4-vinylpyridines, p-aminostyrenes, substituted diallylamines, vinylpiperidines, vinylimidizoles, 2-morpholino-ethyl (meth)acrylate, acrylamide, methacrylamide, N-substituted (meth)acrylamides, methacrylamidopropyl trimethyl ammonium chloride, diallyl dimethyl ammonium chloride, 2-trimethyl ammonium ethyl methacrylic chloride, quaternary amine salts of substituted (meth)acrylic and (meth)acrylamido monomers, methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylonitrile, styrene, substituted styrene, vinyl acetate, vinyl chloride and other $C_1$ to $C_{12}$ alkyl acrylates and methacrylates.

3. The composition of claim 2 wherein said shell is polymerized from a mixture of monomers having acid-ionizable, or quaternary, or quaternizable functionality comprising about 10 to about 60% by weight of said shell.

4. The composition of claim 3 wherein said shell is polymerized from a mixture of monomers having acid-ionizable, or quaternizable functionality comprising about 20 to about 50% by weight of said shell selected from dimethylaminoethyl (meth)acrylate, diethylaminoethyl (meth)acrylate, tert-butylaminoethyl (meth)acrylate, and dimethyl aminopropyl (meth) acrylamide.

5. The composition of claim 1 wherein said core is selected from the group consisting of methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylic acid, methacrylic acid, itaconic acid, maleic acid, fumaric acid, acrylic anhydride, itaconic anhydride, acrylonitrile, styrene, substituted styrene, vinyl acetate, vinyl chloride and other $C_1$ to $C_{12}$ alkyl acrylates and methacrylates.

6. The composition of claim 1 wherein said core-shell polymer has been neutralized by an acid.

7. The composition of claim 6 wherein said acid is selected from the group consisting of acetic acid, formic acid, phosphoric acid, hydrochloric acid, sulfuric acid, methanesulfonic acid, acrylic acid and methacrylic acid.

8. A clear overprint varnish comprising the composition of claim 6.

9. An ink composition comprising the core-shell polymer of claim 6.

10. A process for emulsion polymerization using the core-shell polymer of claim 6 as a seed.

11. The composition of claim 1 wherein said core-shell polymer has been quaternized by a quaternizing agent.

12. The composition of claim 1 wherein said core and said shell are chemically grafted together using one or more polyfunctional compounds selected from the group consisting of
(a) polyfunctional compounds having two or more sites of unsaturation;
(b) reactive chain transfer agents having two or more abstractable atoms; and
(c) hybrid polyfunctional compounds having one or more abstractable atoms and one or more sites of unsaturation.

13. The composition of claim 12 wherein said polyfunctional compound is present during the emulsion polymerization of said shell followed by emulsion polymerization and grafting of said core to said shell.

14. The composition of claim 12 wherein said polyfunctional compound is present during the emulsion polymerization of said shell followed by neutralizing and solubilizing the polymer with an acid or by quaternization followed by emulsion polymerization and grafting of said core to said shell.

15. The composition of claim 13 or 14 wherein said polyfunctional compound has at least two sites of unsaturation of unequal reactivity and is present at a level of from about 2 to about 30% by weight of said shell.

16. The composition of claim 13 or 14 wherein the level of said polyfunctional compound is about 3 to about 10% by weight of said shell.

17. The composition of claim 13 or 14 wherein said polyfunctional compound is selected from the group consisting of methallyl-, crotyl-, and vinylesters of acrylic acid, methacrylic acid, maleic acid (mono- and di-esters), fumaric acid (mono- and di-esters) and itaconic acid (mono- and di-esters); allyl-, methallyl-and crotyl-vinyl ether; N- or N,N-dimethallyl-, crotyl- and vinyl- amides of acrylic acid and methacrylic acid; N-methallyl and crotyl- maleimide; cycloalkenyl esters of acrylic acid, methacrylic acid, maleic acid (mono- and di-esters), fumaric acid (mono-and di-esters), itaconic acid (mono-and di-esters), 1,3-butadiene; isoprene; para-methylstyrene; chloromethylstyrene; methallyl-, crotyl- and vinyl- mercaptan; cycloalkenyl-, methallyl-, vinyl-, and crotylmercaptopropionates; cycloalkyenyl-, methallyl-, vinyl-, and crotylmercaptoacetates; and bromotrichlorome-thane.

18. The composition of claim 13 or 14 wherein said polyfunctional compound is cycloalkenyl and crotyl esters of acrylic and methacrylic acid, crotyl mercaptan, cycloalkyenyl mercaptopropionates, cycloalkyenyl mercaptoacetates, crotyl mercaptopropionate, crotyl mercaptoacetate, or bromotrichloromethane and comprises about 3 to about 10% by weight of said shell.

19. The composition of claim 12 wherein said polyfunctional compound is present during the emulsion polymerization of said core followed by emulsion polymerization and grafting of said shell to said core.

20. The composition of claim 19 wherein said polyfunctional compound has at least two sites of unsaturation of unequal reactivity and is present at a level of from about 0.1 to about 30% by weight of said core.

21. The composition of claim 19 wherein said polyfunctional compound is about 1.0 to about 10% by weight of said core.

22. The composition of claim 19 wherein said polyfunctional compound is selected from the group consisting of allyl-, methallyl-, vinyl-, and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-di-allyl, crotyl-, methallyl-, and vinyl-amides of acrylic and methacrylic acid; N-allyl-, methallyl-, and crotyl-maleimide; vinyl esters of 3-butenoic and 4-pentenoic acids; diallyl phthalate; triallyl cyanurate; O-allyl, methallyl-, crotyl-, O-alkyl-, aryl-, P-vinyl-, P-allyl P-crotyl-, and P-methallylphosphonates; triallyl-, trimethallyl-, and tricrotylphosphates; O,O-diallyl-, dimethallyl-, and dicrotylphosphates; cycloalkenyl esters of acrylic, methacrylic, maleic (mono- and di-esters), fumaric (mono- and di-esters), and itaconic (mono- and di-esters) acids; vinyl ethers and thioethers cycloalkenols and cycloalkene thiols; vinyl esters of cycloalkene carboxylic acids; 1,3-butadiene, isoprene, and other conjugated dienes; para-methylstyrene; chloromethylstyrene; allyl-, methallyl-, vinyl-, and crotyl-mercaptan; cycloalkyenyl-, allyl-, methallyl-, vinyl-, and crotylmercaptopropionates; cycloalkyenyl-, allyl-, methallyl-, vinyl-, and crotylmercaptoacetates; bromotrichloromethane; bromoform; carbon tetrachloride; and carbon tetrabromide.

23. The composition of claim 19 wherein said polyfunctional compound is allyl methacrylate or allyl acrylate and comprises about 1.0 to about 10% by weight of said core.

24. The composition of claim 19 wherein said polyfunctional compound is 1,3-butadiene and comprises up to 100% by weight of said core.

25. The composition of claim 12 wherein said polyfunctional compound is added after emulsion polymerization of said core, allowed to soak into said core and polymerized, followed by emulsion polymerization and grafting of said shell to said core, said polyfunctional compound being present at a level of about 5 to about 30% by weight of said core.

26. The composition of claim 25 wherein said polyfunctional compound is selected from the group consisting of allyl-, methallyl-, vinyl-, and crotyl-esters of acrylic, methacrylic, maleic (mono- and di-esters), fumaric (mono- and di-esters), and itaconic (mono- and di-esters) acids; allyl- methallyl-, and crotyl-vinyl ether and thioether; N- and N,N-di-allyl-, crotyl-, methallyl-, and vinyl-amides of acrylic and methacrylic acid; N-allyl-, methallyl-, and crotyl-maleimide; vinyl esters of 3-butenoic and 4-pentenoic acids; diallyl phthalate; triallyl cyanurate; O-allyl, methallyl-, crotyl-, O-allyl, aryl-, P-vinyl, P-allyl, P-crotyl-, and P-methallylphosphonates; triallyl-, trimethallyl-, and tricrotylphosphates; cycloalkenyl esters of acrylic, methacrylic, maleic (mono- and di-esters), fumaric (mono- and di-esters), and itaconic (mono- and di-esters) acids; vinyl ethers and thioethers of cycloalkenols and cycloalkene thiols; vinyl esters of cycloalkene carboxylic acids; 1,3-butadiene, isoprene, and other conjugated dienes; ethyleneglycol dimethacrylate, diethyleneglycol dimethacrylate, triethyleneglycol dimethacrylate, polyethylene glycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetracrylate, dipentaerthritol pentaacrylate, 1,3-butylene glycol dimethacrylate, trimethylolpropane trimethacrylate, trimethylol propane triacrylate, tripropyleneglycol diacrylate, and divinyl benzene.

27. The composition of claim 1 wherein polyfunctional compounds are absent during the emulsion polymerization of said shell followed by emulsion polymerization of said core-shell polymer.

28. A process for emulsion polymerization using the core-shell polymer of claim 1 as a seed.

* * * * *